United States Patent
Weng et al.

(10) Patent No.: US 7,850,185 B2
(45) Date of Patent: Dec. 14, 2010

(54) CARRYING TRAILER FOR USE WITH BICYCLES

(75) Inventors: Jung-Hui Weng, Kaohsiung (TW); Meng-Kuei Chou, Fongshan (TW); Lee-Rong Chang, Kaohsiung (TW)

(73) Assignee: Free Parable Design Co., Ltd., Kaohsiung (TW)

(*) Notice: Subject to any disclaimer, the term of this patent is extended or adjusted under 35 U.S.C. 154(b) by 167 days.

(21) Appl. No.: 12/340,927

(22) Filed: Dec. 22, 2008

(65) Prior Publication Data

US 2010/0156062 A1   Jun. 24, 2010

(51) Int. Cl.
*B62K 27/00* (2006.01)

(52) U.S. Cl. ............ 280/204; 280/202; 280/288.4; 280/292; 224/400

(58) Field of Classification Search ............ 280/204, 280/202, 645, 292, 656, 288.4, 282; 180/11; 296/168; 224/400, 412, 413, 488
See application file for complete search history.

(56) References Cited

U.S. PATENT DOCUMENTS

| | | | |
|---|---|---|---|
| 4,216,556 A * | 8/1980 | Haeussinger | 5/627 |
| 4,371,184 A | 2/1983 | Henden et al. | |
| 6,070,894 A * | 6/2000 | Augspurger | 280/249 |
| 6,182,990 B1 * | 2/2001 | Everett | 280/204 |
| 6,601,862 B2 * | 8/2003 | Kettler | 280/231 |
| D523,779 S * | 6/2006 | Mattila | D12/101 |
| 7,121,575 B2 * | 10/2006 | Finch | 280/489 |
| 7,172,206 B2 | 2/2007 | Staszak | |
| 7,322,584 B1 * | 1/2008 | Parker | 280/47.131 |
| D573,513 S * | 7/2008 | Koch | D12/101 |
| 7,552,933 B1 * | 6/2009 | Beckman | 280/204 |
| 7,681,906 B2 * | 3/2010 | Shawyer | 280/656 |
| 7,744,111 B2 * | 6/2010 | Anderson | 280/492 |
| D622,208 S * | 8/2010 | Sautter et al. | D12/408 |
| 2007/0235985 A1 * | 10/2007 | Thompson | 280/656 |
| 2007/0246911 A1 * | 10/2007 | Shawyer | 280/414.1 |
| 2007/0252357 A1 * | 11/2007 | Hoskins | 280/415.1 |
| 2008/0042403 A1 * | 2/2008 | Anderson | 280/656 |
| 2009/0026736 A1 * | 1/2009 | Koch | 280/656 |

* cited by examiner

*Primary Examiner*—Lesley Morris
*Assistant Examiner*—Tashiana Adams
(74) *Attorney, Agent, or Firm*—Alan Kamrath; Kamrath & Associates PA (57) ABSTRACT

A carrying trailer for use with bicycles includes a spine, a plurality of branch members and a wheel. The spine has a connecting portion at one end thereof which is adapted to couple to a bicycle. Each branch member has a ring and a supporting arm. The ring is rotatably mounted around the spine. One end of the supporting arm is fixed to an outer radial surface of the ring and the other end thereof extends away from an axis of the ring, with the supporting arm extending in a radial direction of the ring. The wheel pivotably couples to the other end of the spine. Consequently, positions of the branch members on the spine can be adjust to form a loading plane, or to stack the supporting arms of the branch members up at the same side of the spine for reducing storage space.

18 Claims, 12 Drawing Sheets

CARRYING TRAILER FOR USE WITH BICYCLES

BACKGROUND OF THE INVENTION

1. Field of the Invention

The present invention relatives to a carrying trailer and, more particularly, to a carrying trailer for use with bicycles that can be made into a compact size to reduce space taken by it for convenience and ease of storage.

2. Description of the Related Art

A conventional carrying trailer for use with bicycles includes a container for receiving objects like goods or baggage, two wheels separately mounted at two lateral sides and near the rear of the container, and a connecting member with one end thereof coupled to the front of the container. The other end of the connecting member is adapted to be coupled to a rear wheel or a backseat of a bicycle, such that the conventional carrying trailer and the bicycle are linked. In use, the container of the conventional carrying trailer can be pulled behind the bicycle to move along a road with the wheels turning. Hence, a load of objects that the bicycle can carry is increased.

Nevertheless, said conventional carrying trailer for use with bicycles has several drawbacks. For example, the container generally is selected from a large box or a frame made of plural rods, whose shape and size are fixed. And thereby, the container can not be made into a compact size to reduce space taken by the conventional carrying trailer for use with bicycles, so that inconvenience of putting the conventional carrying trailer away in a place or transporting the conventional carrying trailer is caused. Hence, there is a need for an improvement over the conventional carrying trailer for use with bicycles.

SUMMARY OF THE INVENTION

The primary objective of the present invention is to provide a carrying trailer for use with bicycles that solves the problem of the prior art described above to enhance convenience of storage by adjusting an entire size of the carrying trailer for use with bicycles.

The secondary objective of this invention is to provide the carrying trailer for use with bicycles whose length is changeable to improve convenience of using.

Another objective of this invention is to provide the carrying trailer for use with bicycles, which can be linked to rear wheels of various sizes of bicycles.

A carrying trailer for use with bicycles according to the preferred teachings of the present invention includes a spine, a plurality of branch members and a wheel. The spine has a connecting portion at one end thereof. The connecting portion is adapted to couple to a bicycle. Each of the branch members has a ring and a supporting arm. The ring is rotatably mounted around the spine. One end of the supporting arm is fixed to an outer radial surface of the ring and the other end thereof extends away from an axis of the ring, with the supporting arm extending in a radial direction of the ring. The wheel pivotably couples to the other end of the spine. Accordingly, positions of the branch members on the spine can be adjust to form a loading plane for holding goods, or to stack the supporting arms of the branch members up at the same side of the spine for reducing space taken by the carrying trailer for use with bicycles.

In a most preferred form, the spine comprises a first hollow rod having one end forming the connecting portion, a second hollow rod and a third hollow rod, with the second hollow rod having a first end fixing to another end of the first hollow rod and a second end movably extending into the third hollow rod, with the rings of the branch members being rotatably mounted around the first and third hollow rods and being able to axially move along the first and third hollow rods. Accordingly, a length of the spine is changeable to provide convenience of using and reduce space for storage.

In a most preferred form, the carrying trailer for use with bicycles further includes a plurality of positioning modules mounted to the spine, with each positioning module having a positioning block fixed to an outer surface of the spine, with the positioning block having an obstructing portion at one end thereof and a retaining portion protruding from a surface thereof, with each ring having a recess formed in an inner radial surface of the ring and connecting with two end faces of the ring, with a portion of the positioning block between the obstructing portion and the retaining portion wedging in the recess of the ring and the ring being retained between the obstructing portion and the retaining portion of the positioning block. Accordingly, by the positioning modules, the branch members can be positioned without revolving and moving to form the loading plane, such that convenience of using is enhanced.

In a most preferred form, the recess is an open-out recess and each ring further has a storing recess formed in the inner radial surface thereof and connecting with two end faces thereof, with the storing recess being close to or aligned with the supporting arm and separating from the open-out recess. Accordingly, the positioning block can be wedged in the storing recess to stack up all supporting arms at the same side of the spine, so that convenience of storage is improved.

In a most preferred form, each ring further has a plurality of recesses connecting with two end faces thereof, with all recesses being formed in the inner radial surface of the ring with intervals. Accordingly, an included angle of two supporting arms of two branch members adjacent to and abutting each other is changeable.

In a most preferred form, the carrying trailer for use with bicycles further includes a linking module pivotably coupling to the connecting portion of the spine. Accordingly, the carrying trailer for use with bicycles can be coupled to the bicycle.

In a most preferred form, the linking module has a shaft with one end thereof pivotably coupling to the connecting portion of the spine, a connecting member and a plurality of adjusting sleeve, with the connecting member and the adjusting sleeves being mounted around the shaft. Accordingly, by changing arranging order of the connecting member and the adjusting sleeves, the carrying trailer for use with bicycles can be coupled to bicycles with rear wheels of different sizes, and the inclination of the spine relative to the ground can be changed as well.

In a most preferred form, the second hollow rod has a combining through-hole close to the second end thereof extending into the third hollow rod, and the third hollow rod has two combining through-holes adjacent to two ends thereof respectively, with the spine further having a pin inserted into the combining through-hole of the second hollow rod and one of the two combining through-holes of the third hollow rod at the same time. Accordingly, the length of the spine can be securely fixed at a desired length.

In a most preferred form, the second hollow rod has two grooves formed in an outer radial surface thereof with an interval, with the grooves being parallel to an axis of the second hollow rod, with the third hollow rod having two protrusions formed on an inner radial surface thereof to engage with the two grooves respectively. Accordingly, the second hollow rod is able to slide into the third hollow rod without rotating for easily aligning the combining through-holes.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

In the various figures of the drawings, the same numerals designate the same or similar parts. Furthermore, when the terms "first", "second", "third", "end", "axial", "portion", "radial", "length", and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 1:
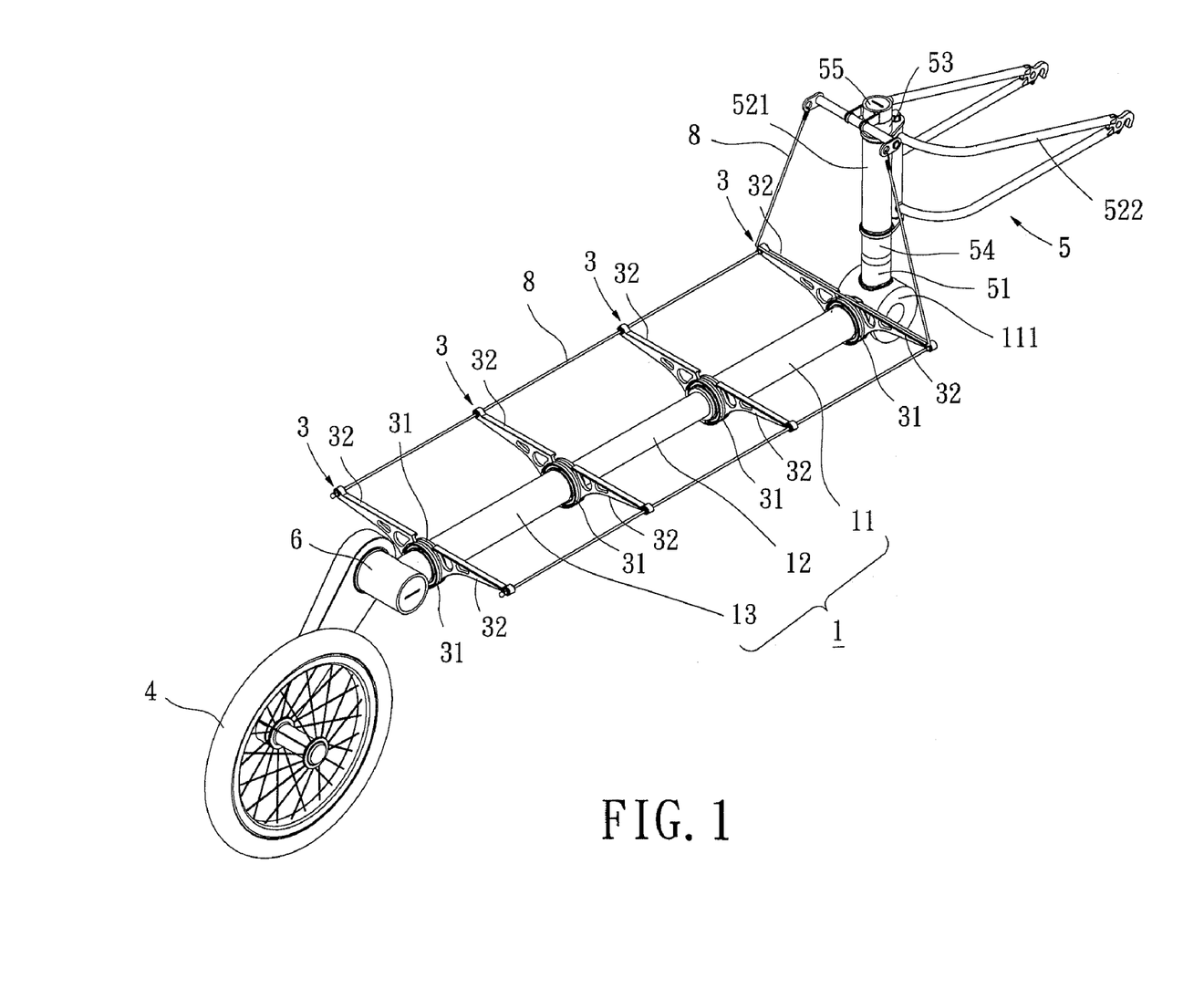
FIG. 1 is a perspective view illustrating a carrying trailer for use with bicycles in accordance with a first embodiment of the present invention.
Figure 2:
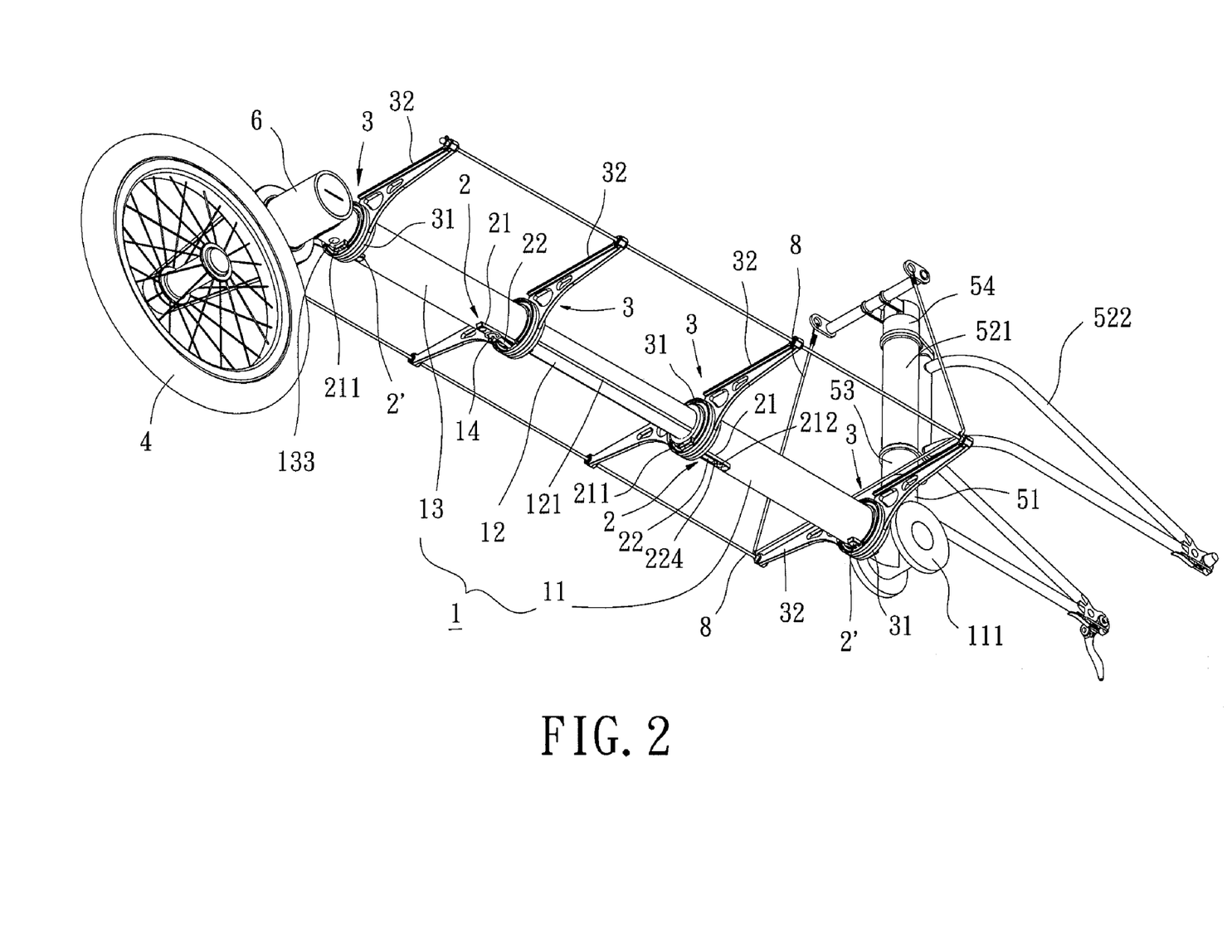
FIG. 2 is another perspective view illustrating the carrying trailer for use with bicycles in accordance with the first embodiment of the present invention.

A carrying trailer for use with bicycles of a first embodiment according to the preferred teachings of the present invention is shown in FIGS. 1 and 2 of the drawings. According to the first embodiment form shown, the carrying trailer for use with bicycles includes a spine 1, a plurality of positioning modules 2 fixedly attached to the spine 1, a plurality of branch members 3 moveably mounted to the spine 1, a wheel 4 coupling to one end of the spine 1, and a linking module 5 coupling to the other end of the spine 1. The branch members 3 are positioned at predetermined positions on the spine 1 by the positioning modules 2, so that each branch member 3 is fixed not to rotate and move along the spine 1. The wheel 4 and the linking module 5 are the backside and the front side of the carrying trailer for use with bicycles respectively.

Figure 3:
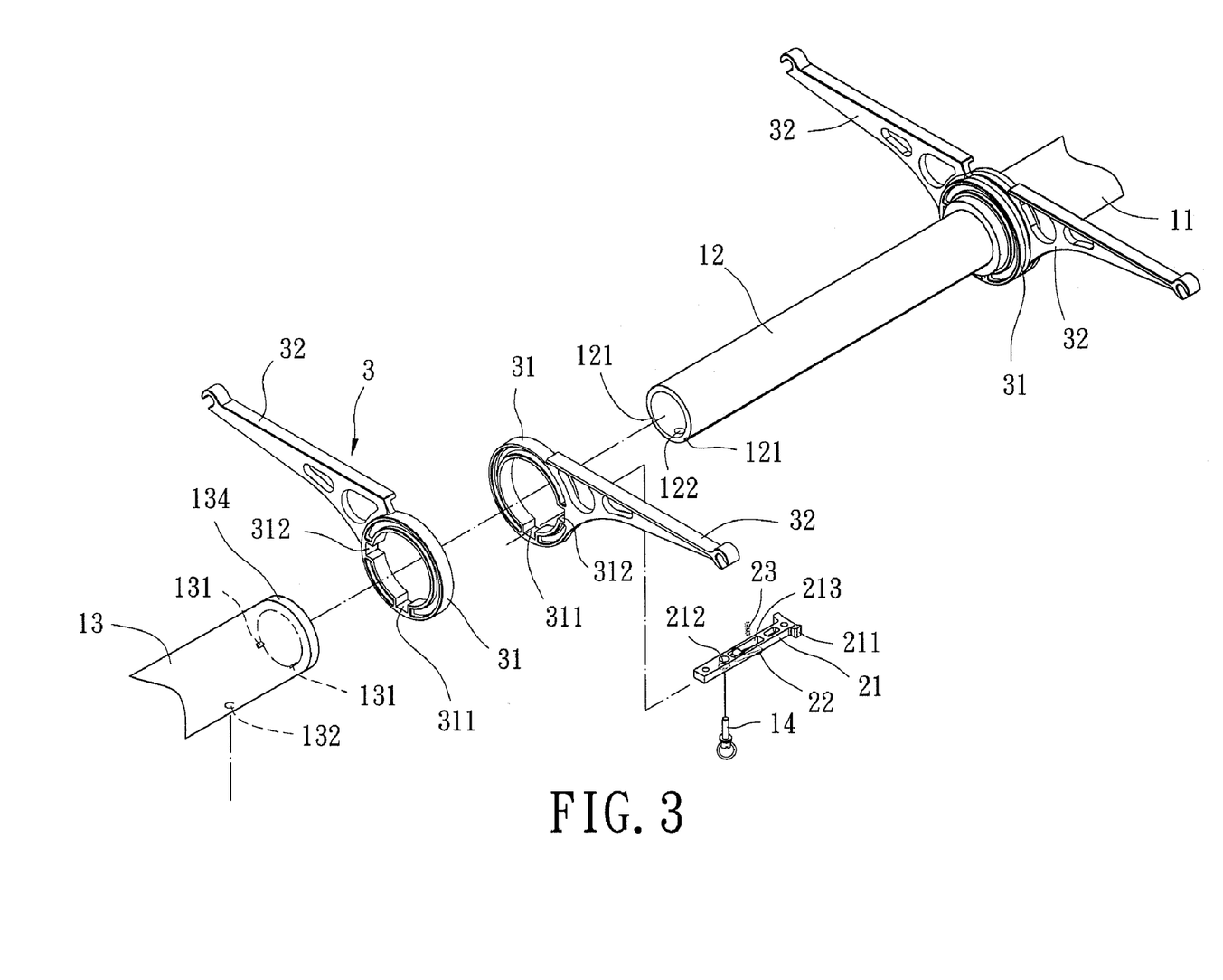
FIG. 3 is an enlarged detailed exploded view illustrating a positioning module and a branch member of the carrying trailer for use with bicycles in accordance with the first embodiment of the present invention.
Figure 4:
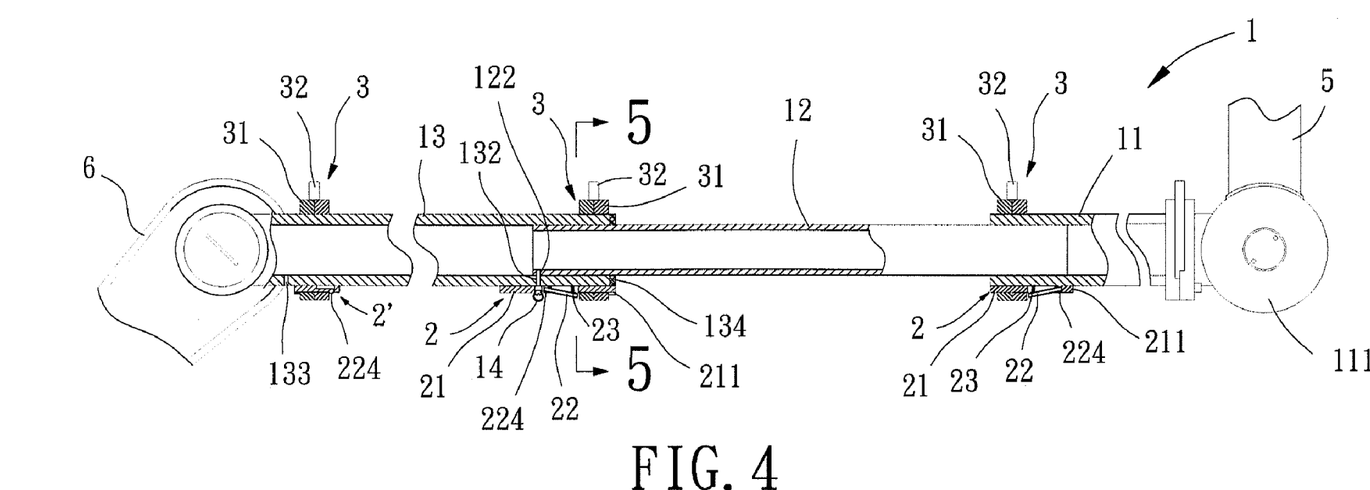
FIG. 4 is an enlarged detailed side view illustrating a spine and the positioning of the carrying trailer for use with bicycles in accordance with the first embodiment of the present invention.
Figure 5:
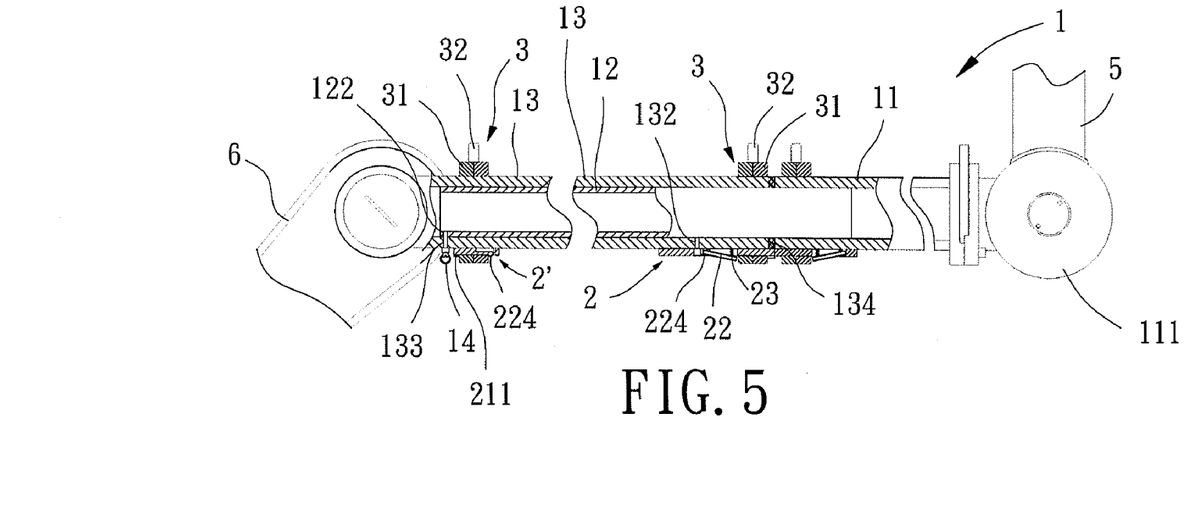
FIG. 5 is another enlarged detailed side view illustrating a spine and the positioning of the carrying trailer for use with bicycles in accordance with the first embodiment of the present invention.

Referring to FIG. 1 to 5, the spine 1 includes a first hollow rod 11, a second hollow rod 12 and a third hollow rod 13, with all of them being preferably made of metal. Furthermore, outer diameters of the first hollow rod 11 and the third hollow rod 13 are the same, and an outer diameter of the second hollow rod 12 is smaller than inner diameters of the first hollow rod 11 and the third hollow rod 13. The first hollow rod 11 has a connecting portion 111 on one end thereof. The second hollow rod 12 has a first end fixing to the other end of the first hollow rod 11 and a second end movably extending into the third hollow rod 13 through one end of the third hollow rod 13, with the first and seconds ends being two opposite ends of the second hollow rod 12. The second hollow rod 12 has two grooves 121 formed in an outer radial surface thereof with an interval, with the grooves 121 being parallel to an axis of the second hollow rod 12. The third hollow rod 13 has two protrusions 131 formed on an inner surface thereof, with each protrusion 131 engaging with each groove 121, so that the second hollow rod 12 is able to slide into the third hollow rod 13 without rotating. Hence, a length of the spine 1 is changeable (seen in FIGS. 6 and 7). Moreover, the protrusions 131 are preferable close to or adjacent to the end of the third hollow rod 13 where the second hollow rod 12 inserts. The second hollow rod 12 has a first combining through-hole 122 close to the end thereof extending into the third hollow rod 13. And the third hollow rod 13 has a second combining through-hole 132 adjacent to the end of the third hollow rod 13 close to the first hollow rod 11 and a third combining through-hole 133 adjacent to the end of the third hollow rod 13 away from the first hollow rod 11, with the first combining through-hole 122 of the second hollow rod 12 being selectively aligned with one of second combining through-hole 132 and the third combining through-hole 133, as shown in FIGS. 4 and 5. Besides, a crack-resisting ring 134 is fixed to an end face of the third hollow rod 13, which the second combining through-hole 132 is close to, to provide protective buffering effect. Thus, shock impulse is absorbed to avoid damage of the spine 1 when the end of the first hollow rod 11 coupling to the second hollow rod 12 hits the end with the second combining through-hole 132 of the third hollow rod 13.

Figure 6:
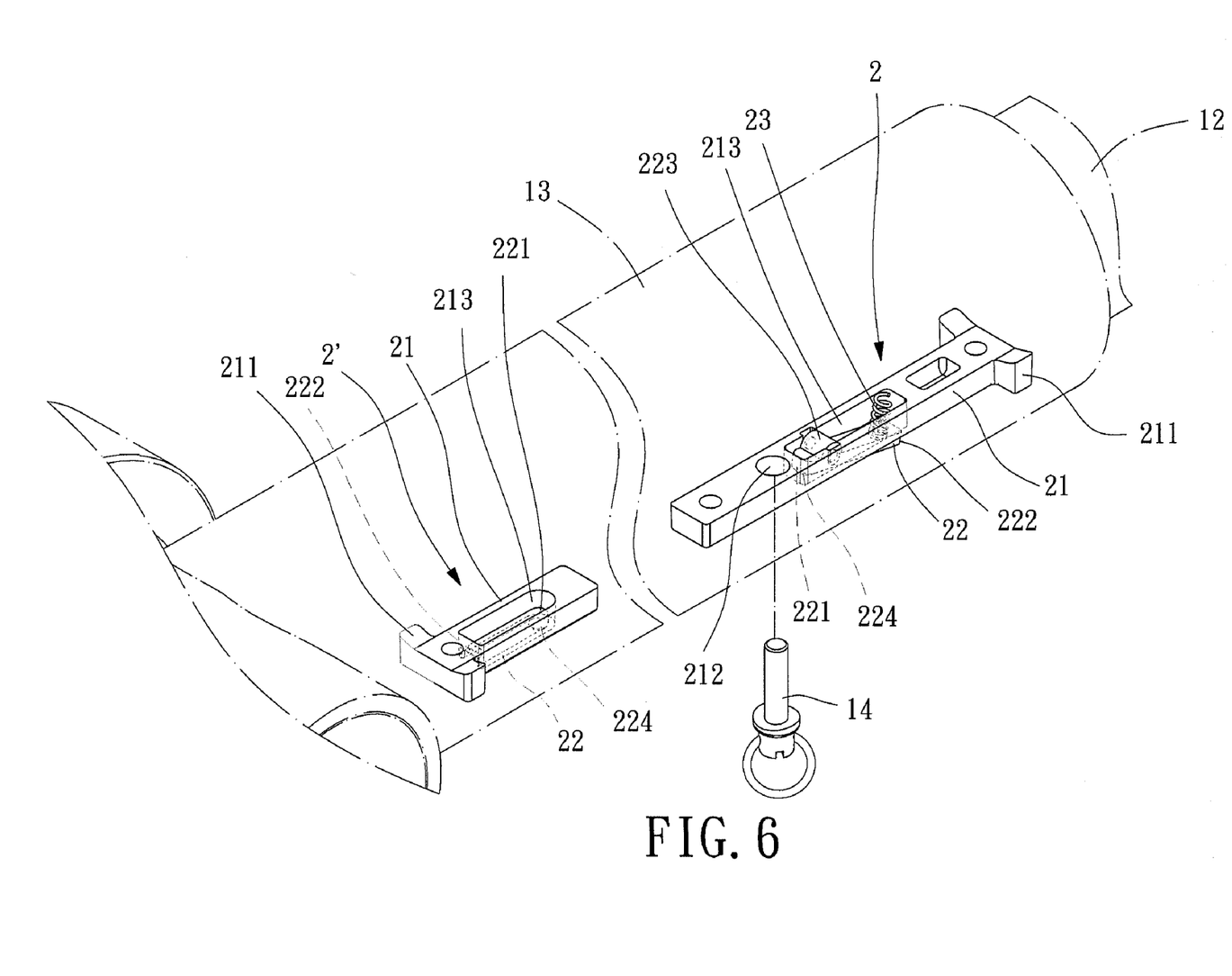
FIG. 6 is an enlarged detailed perspective view illustrating the positioning modules of the carrying trailer for use with bicycles in accordance with the first embodiment of the present invention.

Turning to FIGS. 3 and 6, each positioning module 2 includes a positioning block 21 fixed to the outer surface of the spine 1, a retaining plate 22 coupling to the positioning block 21 and an elastic element 23 connecting to the retaining plate 22. The positioning block 21 is preferable in the form of a T and has an obstructing portion 211 at one end thereof, with a hole 212 passing through the positioning block 21 and being adjacent to the other end of the positioning block 21. The positioning block 21 further has an assembling hole 213 between the hole 212 and the obstructing portion 211. The retaining plate 22 has a first end 221 and a second end 222 at two opposite ends of the retaining plate 22. A bottom surface and a top surface of the retaining plate 22 form a pivot-connecting portion 223 and a semispherical protrusion 224 respectively, with the pivot-connecting portion 223 being between the first end 221 and the second end 222 and the semispherical protrusion 224 being adjacent to the first end 221. The retaining plate 22 is mounted in the assembling hole 213 with the pivot-connecting portion 223 coupling to the positioning block 21. Furthermore, the first end 221 and the second end 222 of the retaining plate 22 are close to the hole 212 and the obstructing portion 211 of the positioning block 21 respectively, such that the retaining plate 22 is regarded as a retaining portion of the positioning block 21. Thus, by the obstructing portion 211 together with the retaining portion, the branch members 3 are positioned. Two ends of the elastic element 23 abut the bottom surface of the retaining plate 22 forming the pivot-connecting portion 223 and the outer radial surface the spine 1 (the first end 11 and the third end 13). The elastic element 23 is adjacent to the second end 222 of the retaining plate 22 to bias and push the second end 222 out of the assembling hole 213 of the positioning block 21, as shown in FIGS. 4 to 6.

Referring back to FIG. 2, in the first embodiment according to the preferred teachings of the present invention, there are two positioning modules 2 mounted to the outer surface of each of the first hollow rod 11 and the third hollow rod 13. Specifically, taking the third hollow rod 13 for example, the positioning block 21 of each positioning module 2 is fixed to the outer surface of the third hollow rod 13, with the obstructing portions 211 being adjacent to the two ends of the third hollow rod 13. All the positioning blocks 21 are arranged along an axis of the spine 1 to be in a straight line and align with each other. Besides, the second combining through-hole 132 is aligned with the hole 212 of the positioning block 21 that is fixed to the end of the third hollow rod 13 having the second combining through-hole 132.

Referring to FIGS. 3 to 6, there is further a pin 14 pushed in the third hollow rod 13 close to one of two ends thereof, with the pin 14 passing through the first combining through-hole 122 of the second hollow rod 12 and the second combining through-hole 132 or the third combining through-hole 133 of the third hollow rod 13 at the same time, such that the second hollow rod 12 and the third hollow rod 13 are fixed not to move relative to each other to restrict the length of the spine 1. Additionally, as seen in FIGS. 2 and 6, two positioning modules 2, which are mounted to two opposite ends of the spine 1, are replaced with two positioning modules 2'. The second end 222 of the retaining plate 22 of each positioning module 2' is securely attached to a periphery of the assembling hole 213 of the positioning block 21, with the retaining plate 22 of the positioning module 2' lacking a pivot-connecting portion. And the semispherical protrusion 224 formed on the retaining plate 22 and adjacent to the first end 221 is out of the assembling hole 213 of the positioning block 21 to provide retaining effect.

Figure 7:
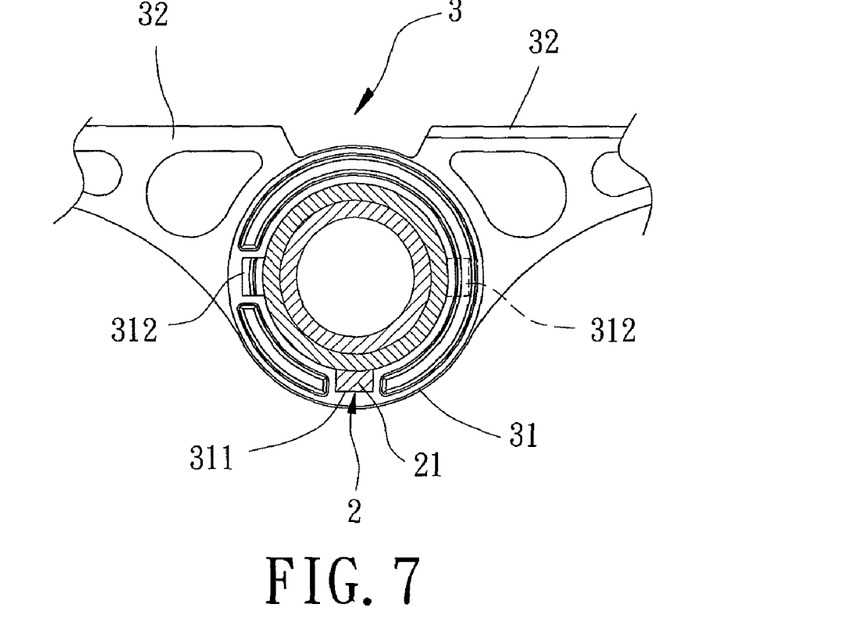
FIG. 7 is a cross sectional view illustrating two branch members engage with the positioning module of the carrying trailer for use with bicycles in accordance with the first embodiment of the present invention.
Figure 8:
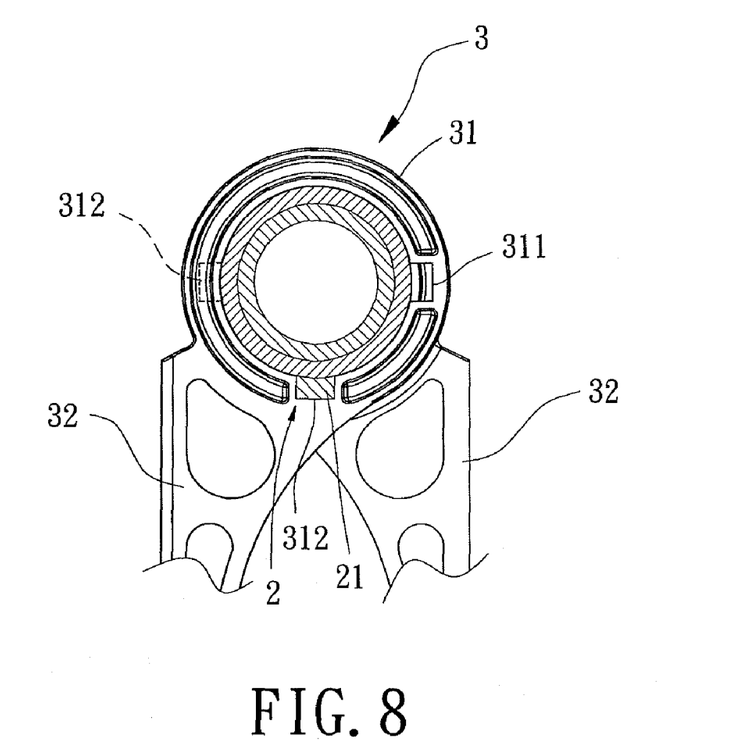
FIG. 8 is another cross sectional view illustrating two branch members engage with the positioning module of the carrying trailer for use with bicycles in accordance with the first embodiment of the present invention.

Referring to FIGS. 3, 7 and 8, each of the branch members 3 includes a ring 31 with a circular axial hole, and a supporting arm 32 coupling to the ring 31. The ring 31 has at least one recess formed in an inner radial surface thereof and connecting with two end faces of the ring 31. In the first embodiment according to the preferred teachings of the present invention, the ring 31 has two recesses, which are open-out recess 311 and a storing recess 312. And the open-out recess 311 and the storing recess 312 are $\pi/2$ apart in a circumference of the ring 31, with a central angle being 90□. One end of the supporting arm 32 is fixed to an outer radial surface of the ring 31 and close to or aligned with the storing recess 312 while the other end of the supporting arm 32 extends away from an axis of the ring 31. Besides, the supporting arm 32 extends in a radial direction of the ring 31 and is preferably perpendicular to the axis of the ring 31.

Figure 12:
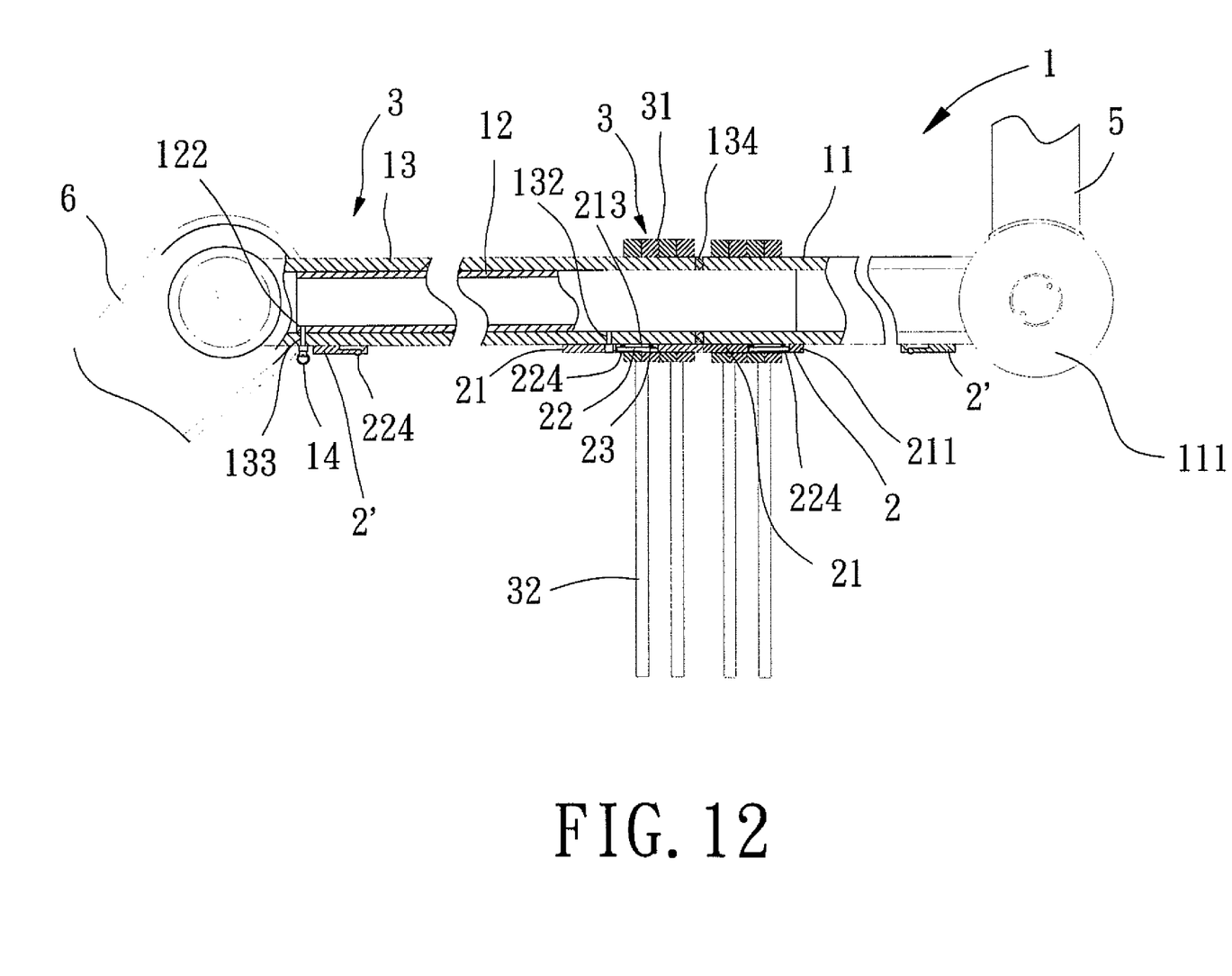
FIG. 12 is an enlarged detailed side view illustrating a stack of supporting arms of the branch members of the carrying trailer for use with bicycles in accordance with the first embodiment of the present invention.

Turning back to FIGS. 1 to 3, there are four branch members 3 mounted to ends of the first hollow rod 11, and the same for the third hollow rod 13. In detail, the ring 31 of each branch member 3 is rotatably mounted around the first hollow rod 11 or the third hollow rod 13, with the ring 31 being able to move along an axis of the first hollow rod 11 or the third hollow rod 13. By a portion of the positioning block 21 between the obstructing portion 211 and the retaining plate 22 wedging in two open-up recesses 311 of two ring 31 of two branch members 3 adjacent to and abutting against each other (seen in FIGS. 2 and 7) and the two rings 31 being sandwiched between the obstructing portion 211 of the positioning block 21 and the retaining plate 22, the two supporting arms 32 of the branch members 3 are in a wings-spreading state relative to the spine 1. Hence, the spine 1 and plural supporting arms 32 together form a loading plane for objects or goods to be disposed. Otherwise, referring to FIG. 8, the two rings 31 adjacent to and abutting against each other are sandwiched between the obstructing 211 and the retaining plate 22, with the portion of the positioning block 21 between the obstructing portion 211 and the retaining plate 22 wedging in two storing recesses 312 of the two rings 31. As FIG. 12 showing a storing state of the carrying trailer for use with bicycles, all of the supporting arms 32 of the branch members 3 are stacked up at the same side of the spine 1. As mentioned above, when the ring 31 of each branch member 3 is designed to have two recesses, positions of the supporting arms 32 relative to the spine 1 are changeable for using or storage.

Referring back to FIG. 1, the wheel 4 is preferably combined with the spine 1 through a pivoting member 6. The pivoting member 6 has a two-dead-point mechanism for the wheel 4 to pivot on and adjust positions of the wheel 4 relative to the spine 1. Therefore, in addition to use of the wheel 4, the wheel 4 is collapsed to lap over the spine 1 for storage (seen in FIGS. 1 and 13 respectively showing a using state and a storing state of the wheel 4).

Figure 9:
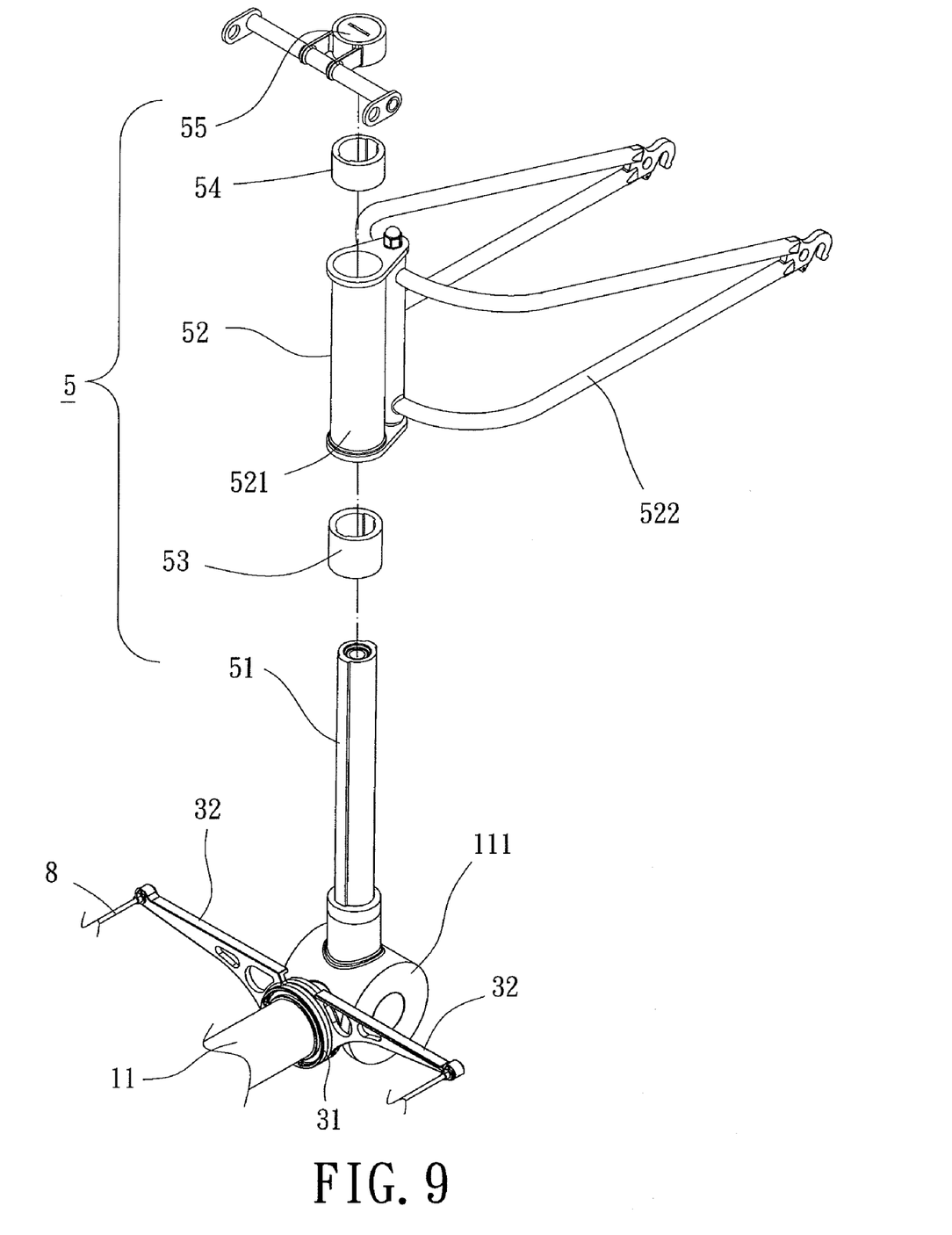
FIG. 9 is an exploded perspective view illustrating a linking module of the carrying trailer for use with bicycles in accordance with the first embodiment of the present invention.

Referring to FIG. 9, the linking module 5 includes a shaft 51 with one end thereof pivotably coupling to the connecting portion 111 of the first hollow rod 11 of the spine 1, a connecting member 52 having a sleeve 521 and a linking arm 522, a first adjusting sleeve 53 mounted around the shaft 51, a second adjusting sleeve 54 mounted around the shaft 51, and a lid 55 removably coupling to the other end of the shaft 51. Preferably, the shaft 51 is perpendicular to the spine 1. The sleeve 521 of the connecting member 52 is also mounted around the shaft 51 and the linking arm 522 is fastened to an outer surface of the sleeve 521, with the linking arm 522 being preferable a rod in the form of a "U", so that the linking arm 522 will not contact with a rear wheel 7 or other parts of a bicycle when the linking arm 522 is coupled to the bicycle (see FIG. 10). Moreover, the lid 55 is securely mounted to the end of the shaft 51 by threads provided on the lid 55 and the shaft 51, so that disengagement of the connecting member 52, the first adjusting sleeve 53 and the second adjusting sleeve 54 from the shaft 51 is avoided. Further, as shown in FIGS. 1 and 2, a plurality of ropes 8 is fixed between any two adjacent branch members 3 and between the lid 55 of the linking module 5 and free ends of the supporting arms 3 of the branch members 3 to strengthen the loading plane formed by the spine 1 and the supporting arms 32. Thus, a load carried by the carrying trailer for use with bicycles of the present invention is increased to hold an object 9 (seen in FIG. 10) more stably.

Referring to FIGS. 1, 2, 7 and 10, in use of the carrying trailer for use with bicycles of the first embodiment according to the preferred teachings of the present invention, the ring 31 of each branch member 3 is rotated to make the open-out recess 311 to align with a remaining portion of the positioning block 21 other than the obstructing portion 211. And then the ring 31 is pushed to move toward the positioning block 21 to engage the remaining portion of the positioning block 21 through the open-out recess 311 (seen in FIG. 7). The above steps are repeated to retain two rings 31 between the obstructing portion 211 of the positioning 21 and the second end 222 of the retaining plate 22. Therefore, the supporting arms 32 of any two adjacent branch members 3 are in the wings-spreading state and extend towards two opposite sides of the spine 1 to form the loading plane for holding the object 9 (seen in FIG. 9), with an included angle of the two supporting arms 32 being 180□. Besides, after the object 9 is disposed on the loading plane, the object 9 is covered by a net 91 and the net 91 is coupled to the supporting arms 32 by knots or clasps, so that the object 9 falling from the carrying trailer for use with bicycles is avoided.

Figure 10:
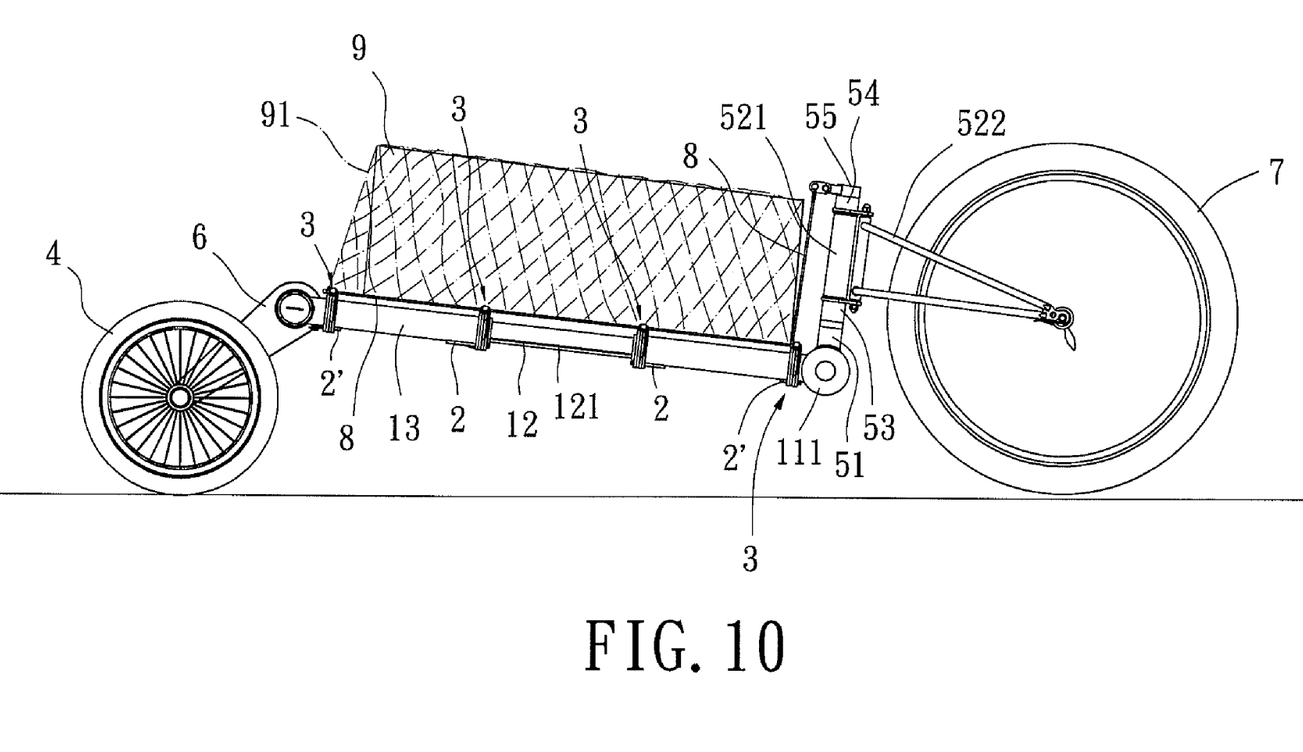
FIG. 10 is a side view illustrating the carrying trailer for use with bicycles of FIG. 1 coupled to a wheel.
Figure 11:
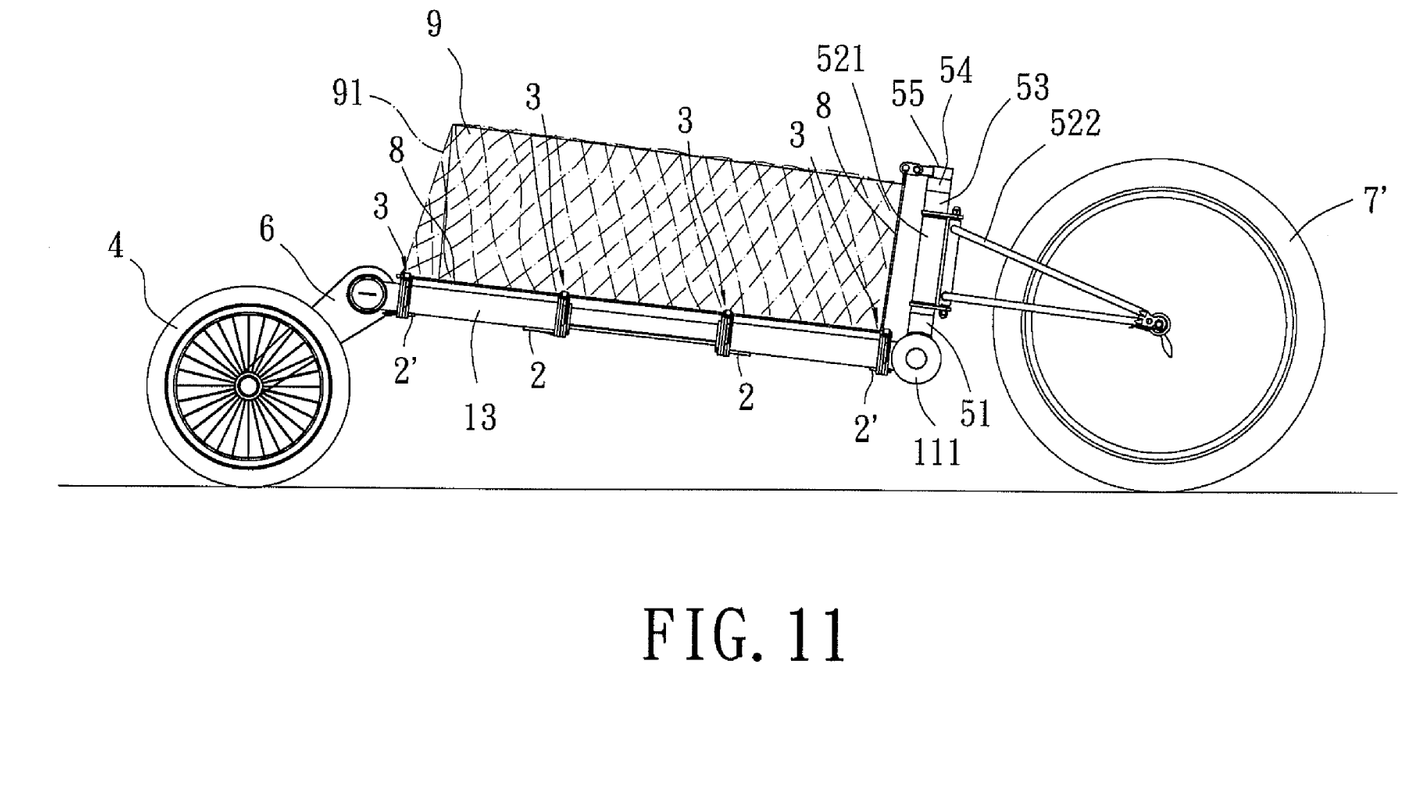
FIG. 11 is another side view illustrating the carrying trailer for use with bicycles of FIG. 1 coupled to a wheel.

Moreover, as shown in FIG. 9 to 11, the connecting member 52, the first adjusting sleeve 53 and the second adjusting sleeve 54 are mounted around the shaft 51 through the end of the shaft 51 which is away from the connecting portion 111 of the first hollow rod 11, with the arranging order of the connecting member 52, the first adjusting sleeve 53 and the second adjusting sleeve 54 being changeable. In detail, the first adjusting sleeve 53, the connecting member 52 and the second adjusting sleeve 54 are mounted around the shaft 51 in sequence and then the lid 55 is screwed to the shaft 51, with the connecting member 52 being between the first adjusting sleeve 53 and the second adjusting sleeve 54 and the linking arm 522 of the connecting member 52 being coupled to the rear wheel 7. FIG. 11 illustrates that the carrying trailer for use with bicycles is coupled to a rear wheel 7' having a diameter smaller than that of the rear wheel 7. For coupling to the rear wheel 7', the lid 55 is removed from the shaft 51 to remove the connecting member 52, the first adjusting sleeve 53 and the second adjusting sleeve 54 from the shaft 51 and then the arranging order of the three components is changed, with the first adjusting sleeve 53 and the second adjusting sleeve 54 being stacked on a top of the sleeve 521 of the connecting member 52. Hence, a position of the connecting member 52 relative to the shaft 51 is lowered. By changes of the arranging order of the connecting member 52, the first adjusting sleeve 53 and the second adjusting sleeve 54, the carrying trailer for use with bicycles can be coupled to bicycles with rear wheels of different sizes, and the inclination of the spine 1 relative to the ground can be changed as well.

Turning to FIGS. 4 and 5, in adjustment of the length of the spine 1, taking shortening of the spine 1 for example, the pin 14 is removed from the second combining through-hole 132 of the third hollow rod 13 and then the first hollow rod 11 is pushed toward the third hollow rod 13, such that the second hollow rod 12 is smoothly moved into the third hollow rod 13 through the grooves 121 to make the first combining through-hole 122 of the second hollow rod 12 to align with the third combining through-hole 133 of the third hollow rod 13. And thereby, the spine 1 is shortened. Finally, the pin 14 is inserted into the third combining through-hole 133 of the third hollow rod 13 and the first combining through-hole 122 of the second hollow rod 12 at the same time, as shown in FIG. 5. If the spine 1 is to be lengthened, the above steps are repeated in reverse order, with the first hollow rod 11 being moved away from the third hollow rod 13 and the pin 14 being inserted into the hole 212 of the positioning block 21, the second combining through-hole 132 of the third hollow rod 13 and the first combining through-hole 122 of the second hollow rod 12 (seen in FIG. 4).

Figure 13:
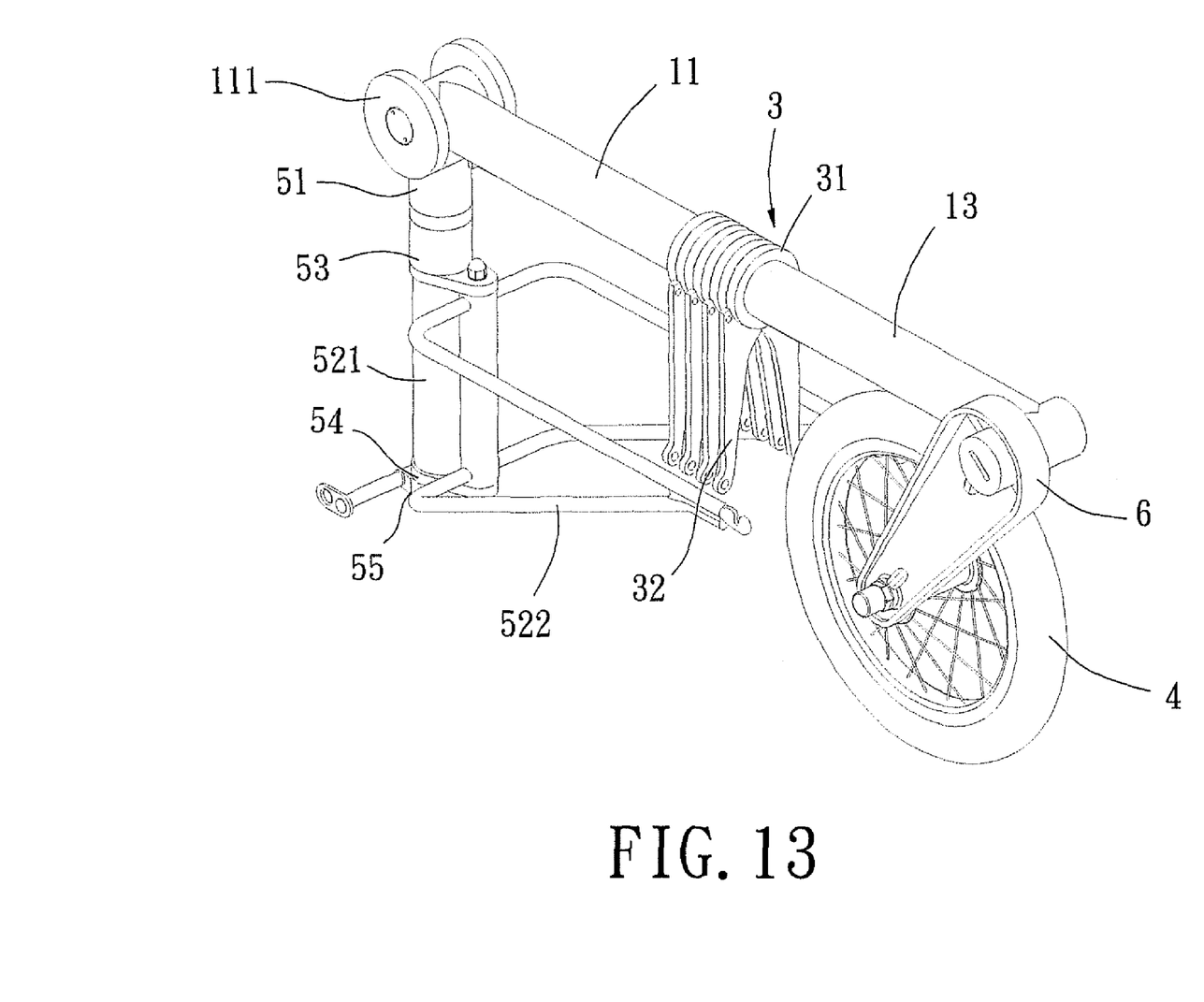
FIG. 13 is a perspective view illustrating the carrying trailer for use with bicycles in a storing state for putting it away.

Referring to FIGS. 12 and 13, for putting the carrying trailer for use with bicycles of the present invention away when it is not used, the pin 14 is initially removed and the above steps for shortening the spine 1 are repeated (seen in FIG. 5). The branch members 3 disposed at the two opposite ends of the spine 1 are moved to disengage from the positioning modules 2 and the rings 31 are rotated to make alignment of the storing recesses 312 (seen in FIG. 8). And then the branch members 3 disposed at the two opposite ends of the spine 1 are moved towards the middle of the spine 1 to engage with the positioning modules 2 close to the middle of the spine 1, with the rings 31 being retained between the obstructing portion 211 of the positioning block 21 and the semispherical protrusion 224 of the retaining plate 22 (seen in FIG. 12). Finally, the wheel 4 is pivoted on the spine 1 through the pivoting member 6 to lap over the spine 1, and the linking module 5 is pivoted on the connecting portion 111, such that the supporting arms 32 of the branch members 3, the wheel 4 and the linking module 5 are at the same side of the spine 1, where the wheel 4 is lapped. Therefore, by folding the carrying trailer for use with bicycles, space taken by it is reduced and convenience of storage is allowed.

Figure 14:
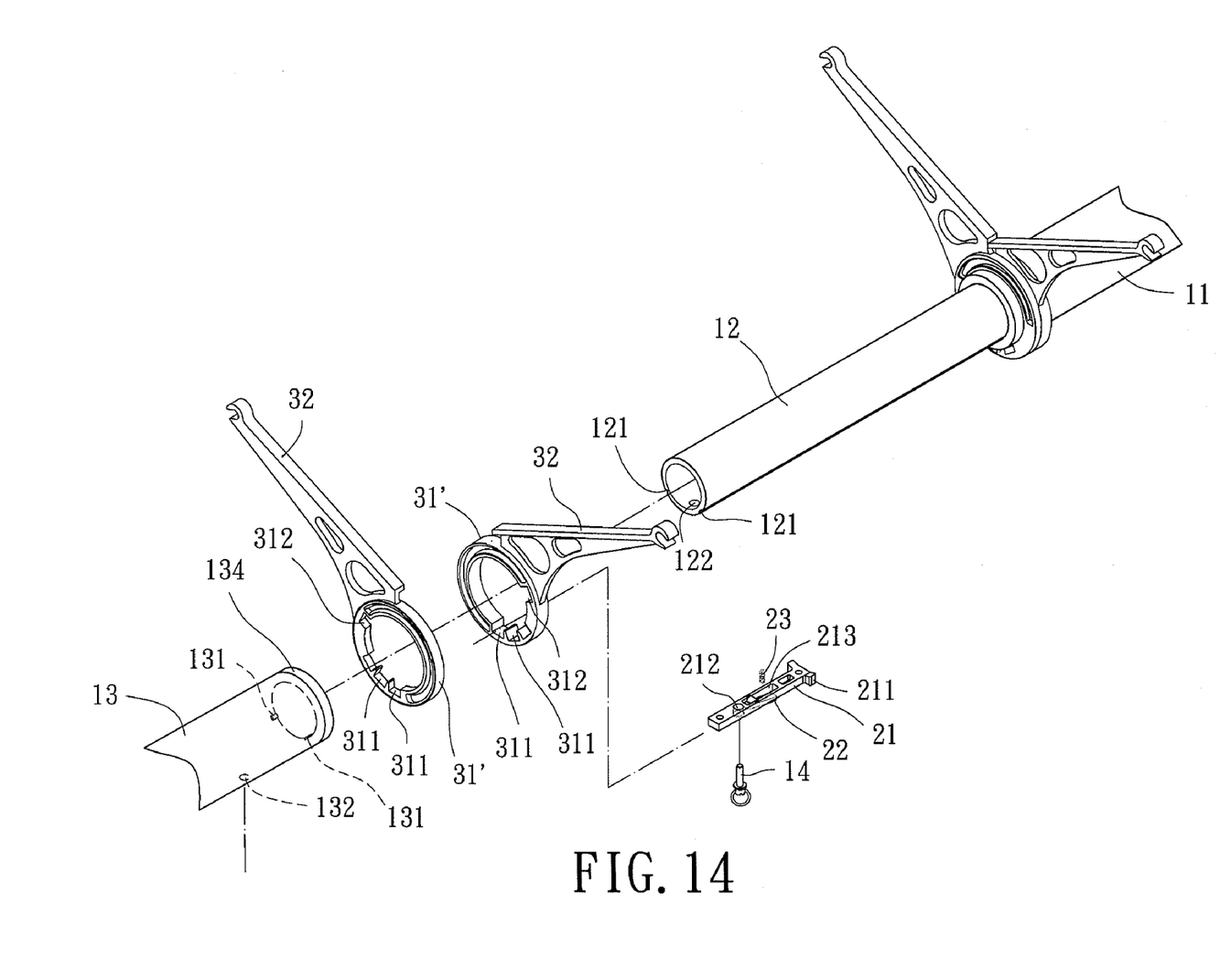
FIG. 14 is an enlarged detailed exploded view illustrating a positioning module and a branch member of the carrying trailer for use with bicycles in accordance with a second embodiment of the present invention.

FIG. 14 shows a carrying trailer for use with bicycles of a second embodiment according to the preferred teachings of the present invention modified from the first embodiment, whose each ring 31' has a plurality of open-out recesses 311 and a storing recess 312 formed in an inner radial surface thereof wit intervals. All of the recesses 311, 312 connect with two end faces of the ring 31' and the storing recess 312 of each ring 31' is close to or aligned with the supporting arm 32. By this configuration, each ring 31' can engage with the positioning block 21 through different open-out recesses 311 to change the position of each supporting arm 32 relative to the spine 1, so that an included angle of two supporting arms 32 of two branch members 3 adjacent to and abutting each other is changeable. Thus, a cross-section of the loading plane formed by the spine 1 and the branch members 3 can be adjusted according to size of the object 9.

As has been discussed above, by the positioning modules 2, the branch members 3 can be securely positioned to the spine 1 to form the loading plane for carrying goods, or the supporting arms 32 of the branch members 3 can be securely stacked at the same side of the spine 1 for reducing space taken by the carrying trailer for use with bicycles. Plus the adjustable length of the spine 1 and the pivotable wheel 4 results in that the carrying trailer for use with bicycles is foldable into a smaller size. Consequently, convenience of using is enhanced and space for storage is reduced.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A carrying trailer for use with bicycles, comprising:
    a spine having a connecting portion at one end thereof, with the connecting portion being adapted to couple to a bicycle;
    a plurality of branch members, each of which has a ring rotatably mounted around the spine and a supporting arm with one end fixed to an outer radial surface of the ring and the other end extending away from an axis of the ring, with the supporting arm extending in a radial direction of the ring; and
    a wheel pivotably coupling to the other end of the spine.

2. The carrying trailer for use with bicycles as defined in claim 1, wherein the spine comprises a first hollow rod having one end forming the connecting portion, a second hollow rod and a third hollow rod, with the second hollow rod having a first end fixing to another end of the first hollow rod and a second end movably extending into the third hollow rod, with the rings of the branch members being rotatably mounted around the first and third hollow rods and being able to axially move along the first and third hollow rods.

3. The carrying trailer for use with bicycles as defined in claim 1 further comprising a plurality of positioning modules mounted to the spine, with each positioning module having a positioning block fixed to an outer surface of the spine, with the positioning block having an obstructing portion at one end thereof and a retaining portion protruding from a surface thereof, with each ring having a recess formed in an inner radial surface of the ring and connecting with two end faces of the ring, with a portion of the positioning block between the obstructing portion and the retaining portion wedging in the recess of the ring and the ring being retained between the obstructing portion and the retaining portion of the positioning block.

4. The carrying trailer for use with bicycles as defined in claim 3, wherein the recess is an open-out recess and each ring further has a storing recess formed in the inner radial surface thereof and connecting with two end faces thereof, with the storing recess being close to or aligned with the supporting arm and separating from the open-out recess.

5. The carrying trailer for use with bicycles as defined in claim 4, wherein the open-out recess and the storing recess is π/2 apart in a circumference of the ring.

6. The carrying trailer for use with bicycles as defined in claim 5, wherein each ring further has a plurality of recesses connecting with two end faces thereof, with all recesses being formed in the inner radial surface of the ring with intervals.

7. The carrying trailer for use with bicycles as defined in claim 3, wherein each positioning module further has a retaining plate and each positioning block has an assembling hole beside the obstructing portion, with the retaining plate being pivotably mounted in the assembling hole.

8. The carrying trailer for use with bicycles as defined in claim 7, wherein each positioning module further has an elastic element with two ends abutting a surface of the retaining plate and the outer radial surface of the spine, with the elastic element being close to and biasing one end of the retaining plate out of the assembling hole to form the retaining portion of the positioning block.

9. The carrying trailer for use with bicycles as defined in claim 8, wherein a bottom surface and a top surface of each retaining plate form a pivot-connecting portion and a semispherical protrusion respectively, with the pivot-connecting portion being in the assembling hole and coupling to the positioning block for the retaining plate to be a seesaw balanced in the pivot-connecting portion, with the semispherical protrusion being adjacent to one end of the retaining plate and away from the obstructing portion of the positioning block.

10. The carrying trailer for use with bicycles as defined in claim 7, wherein one end of each retaining plate is securely attached to a periphery of the assembling hole of the positioning block, with a semispherical protrusion being formed on the retaining plate and out of the assembling hole.

11. The carrying trailer for use with bicycles as defined in claim 2, wherein the second hollow rod has a combining through-hole close to the second end thereof extending into the third hollow rod, and the third hollow rod has two combining through-holes adjacent to two ends thereof respectively, with the spine further having a pin inserted into the combining through-hole of the second hollow rod and one of the two combining through-holes of the third hollow rod at the same time.

12. The carrying trailer for use with bicycles as defined in claim 2, wherein the first hollow rod, the second hollow rod and the third hollow rod are all round rods, and each ring of the branch members has a circular axial hole.

13. The carrying trailer for use with bicycles as defined in claim 2, wherein the second hollow rod has two grooves formed in an outer radial surface thereof with an interval, with the grooves being parallel to an axis of the second hollow rod, with the third hollow rod having two protrusions formed on an inner radial surface thereof to engage with the two grooves respectively.

14. The carrying trailer for use with bicycles as defined in claim 3, wherein all the positioning blocks are arranged along an axis of the spine to be in a straight line and align with each other.

15. The carrying trailer for use with bicycles as defined in claim 1 further including a linking module pivotably coupling to the connecting portion of the spine, with the linking module being adapted to couple to the bicycle.

16. The carrying trailer for use with bicycles as defined in claim 15, wherein the linking module has a shaft with one end thereof pivotably coupling to the connecting portion of the spine, a connecting member and a plurality of adjusting sleeves, with the connecting member and the adjusting sleeves being mounted around the shaft.

17. The carrying trailer for use with bicycles as defined in claim 16, wherein the connecting member has a sleeve mounted around the shaft and a linking arm fixed to an outer surface of the sleeve.

18. The carrying trailer for use with bicycles as defined in claim 1, wherein the supporting arm is perpendicular to an axis of the ring.

* * * * *